United States Patent [19]

Saleme

[11] Patent Number: 5,443,037
[45] Date of Patent: Aug. 22, 1995

[54] CANINE SEAT BELT AND HARNESS

[76] Inventor: M. Cecilia Saleme, 1550 N. San Marcos Rd., Santa Barbara, Calif. 93111

[21] Appl. No.: 231,660

[22] Filed: Apr. 25, 1994

[51] Int. Cl.$^6$ .............................................. A01K 27/00
[52] U.S. Cl. ..................................... 119/771; 119/907; 119/792; 297/473; 297/485
[58] Field of Search ............... 119/771, 784, 792, 793, 119/907, 865, 769, 770, 795; 297/464, 465, 473, 485

[56] References Cited

U.S. PATENT DOCUMENTS

| | | | |
|---|---|---|---|
| 2,833,343 | 5/1958 | Benson | 297/473 |
| 2,909,154 | 10/1959 | Thomas | 119/771 |
| 3,321,247 | 5/1967 | Dillender | 297/473 |
| 3,529,864 | 9/1970 | Rose et al. | 297/473 |
| 4,559,906 | 12/1985 | Smith | 119/907 |
| 4,709,966 | 12/1987 | Parkinson et al. | 297/473 |
| 4,827,876 | 5/1989 | Krekelberg | 119/771 |
| 5,154,660 | 10/1992 | Snyder et al. | 119/771 |
| 5,161,486 | 11/1992 | Brown | 119/795 |
| 5,305,710 | 4/1994 | Ward, Jr. | 119/907 |

FOREIGN PATENT DOCUMENTS 1194738  10/1985  Canada ................................ 119/907

Primary Examiner—Todd E. Manahan

[57] ABSTRACT

A flexible harness member has spaced first and second straps arranged for securement about an animal. The first and second straps have a central connecting web, and the central connecting web includes a central web strap. To the central web strap is mounted a third "D" ring member, that in turn is secured to a tether strap via a hook member, with the tether strap having a first "D" ring and a second "D" ring. The second "D" ring is secured to the hook member, and a first flexible web member is arranged for securement about a vehicle cushion member, with the first "D" ring slidably receiving the first flexible web therethrough.

2 Claims, 4 Drawing Sheets

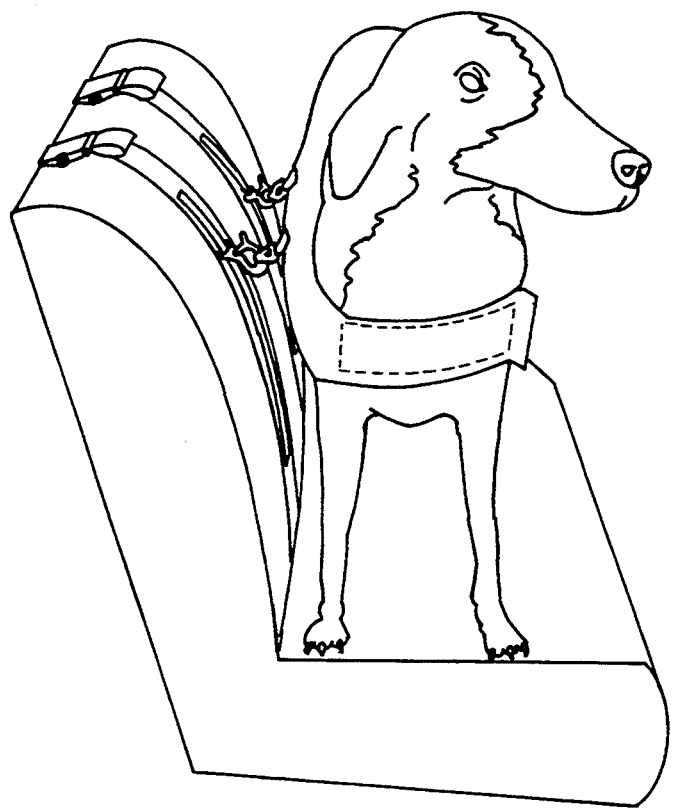
FIG. 1
PRIOR ART
FIG. 2
PRIOR ART
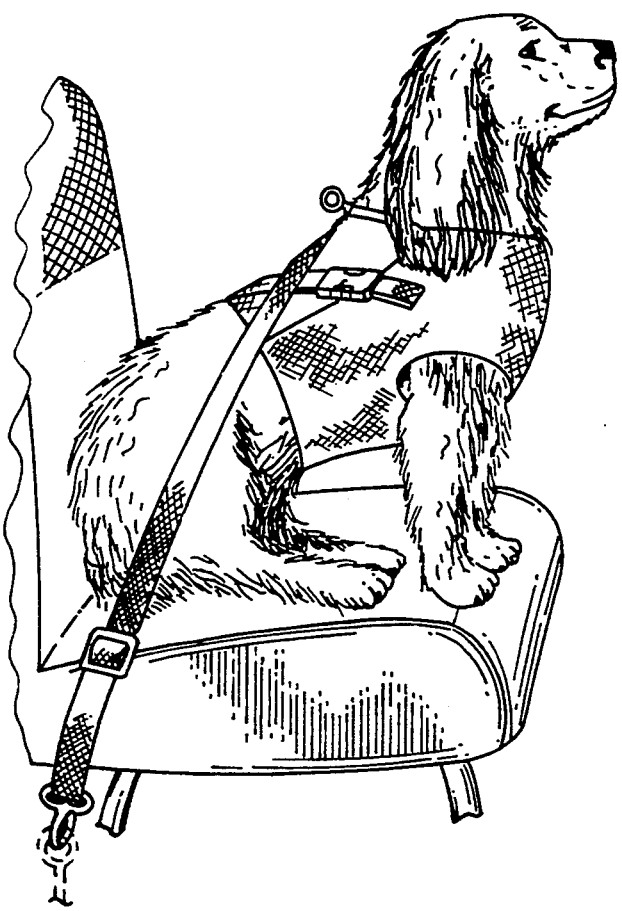

CANINE SEAT BELT AND HARNESS

TECHNICAL FIELD

The invention set forth herewithin is directed to a seat belt structure for the securement and restraint of animals, and more particularly to dogs, relative to a vehicular seat.

BACKGROUND OF THE INVENTION

A history of prior art structure related to the restraint and securement of animals relative to a vehicle seat has been presented in the prior art and exemplified by the U.S. Pat. Nos. 4,324,204, 4,715,618, and 4,537,154.

Relative to such patents, they have been associated in recent years to concerns of safety in restraining occupants within vehicles relative to their displacement during impact and to this end, seat belts, air bags, safety seats for children, and the like have been regulated into use. The combination of pets is addressed in the prior art to prevent their becoming projectiles and victims in traffic accidents, such that the U.S. Pat. No. 4,324,204 sets forth spaced, parallel straps to maintain an animal in a substantially parallel relationship relative to a seat upper portions; wherein U.S. Pat. No. 4,715,618 sets forth a seat strap structure arranged for mounting to the floor portions of an associated vehicle.

The instant invention is directed to overcoming deficiencies of the prior art by providing for ease of retrofit of an animal strap structure or permitting relative mobility of the animal relative to the seat to provide for comfort of an animal to be more content in use.

SUMMARY OF THE INVENTION

The present invention relates accordingly to a first web member that is arranged for mounting about a seat upper, having a tether strap directed in a sliding relationship relative to the first web to a harness member that is easily secured relative to the animal to permit ease of retrofit of the organization relative to an associated vehicle structure.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a prospective view of a prior art animal restraint structure as indicated in U.S. Pat. No. 4,324,204.

FIG. 2 is a prior art animal restraint structure as indicated in U.S. Pat. No. 4,715,618.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

With reference to FIGS. 1 and 2 note prior art structure relative to animal restraint devices as indicated in the respective U.S. Pat. Nos. 4,324,204 and 4,715,618.

Figure 3:
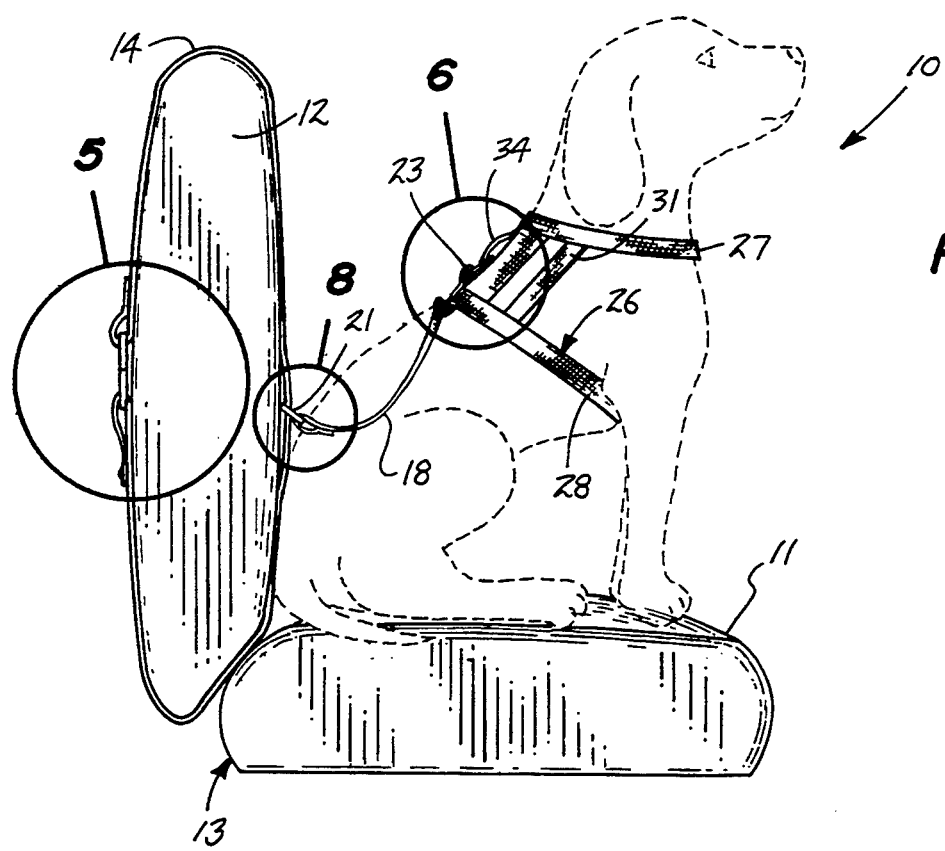
FIG. 3 is a side view, taken in elevation, of the seat belt structure of the invention.
Figure 4:
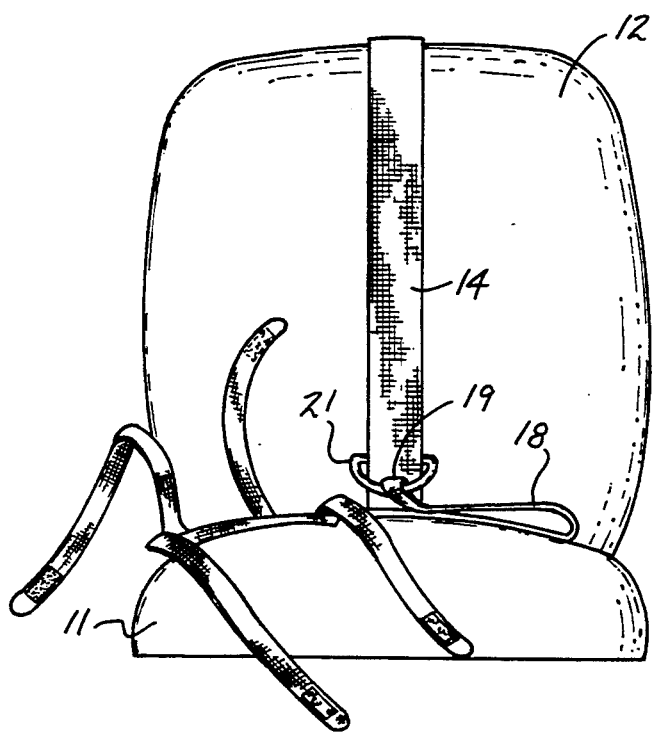
FIG. 4 is a frontal view, taken in elevation, of the invention mounted to an associated vehicle seat.
Figure 5:
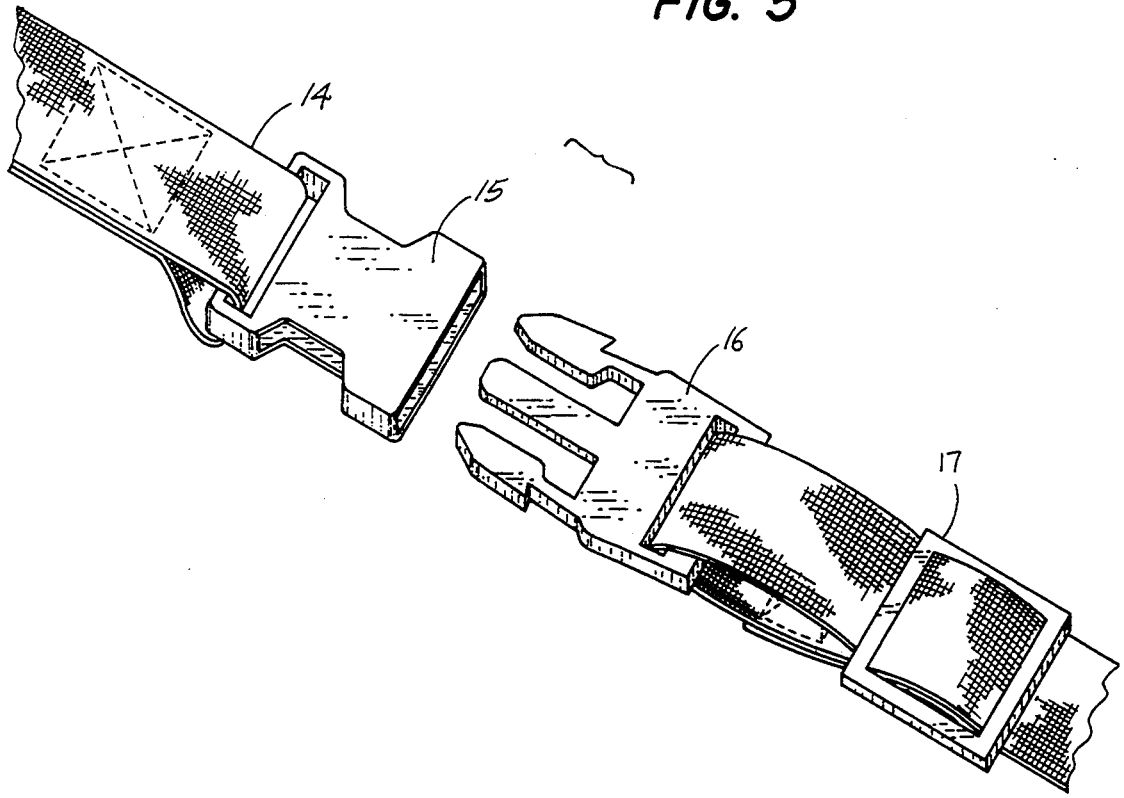
FIG. 5 is an enlarged prospective view of section 5 as set forth in FIG. 3.
Figure 6:
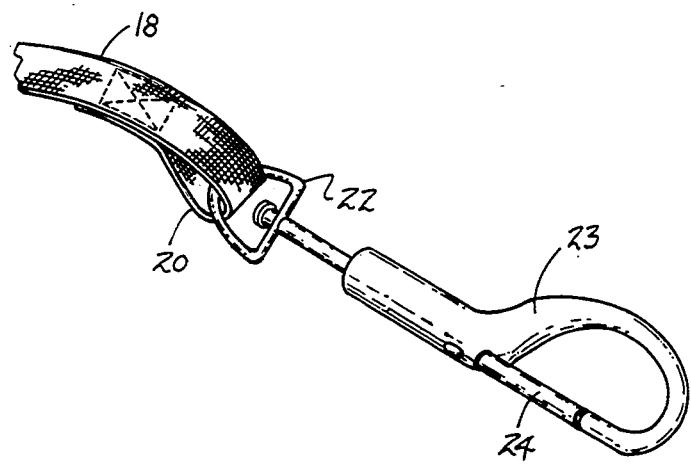
FIG. 6 is an enlarged prospective view of section 6 as set forth in FIG. 3.
Figure 7:
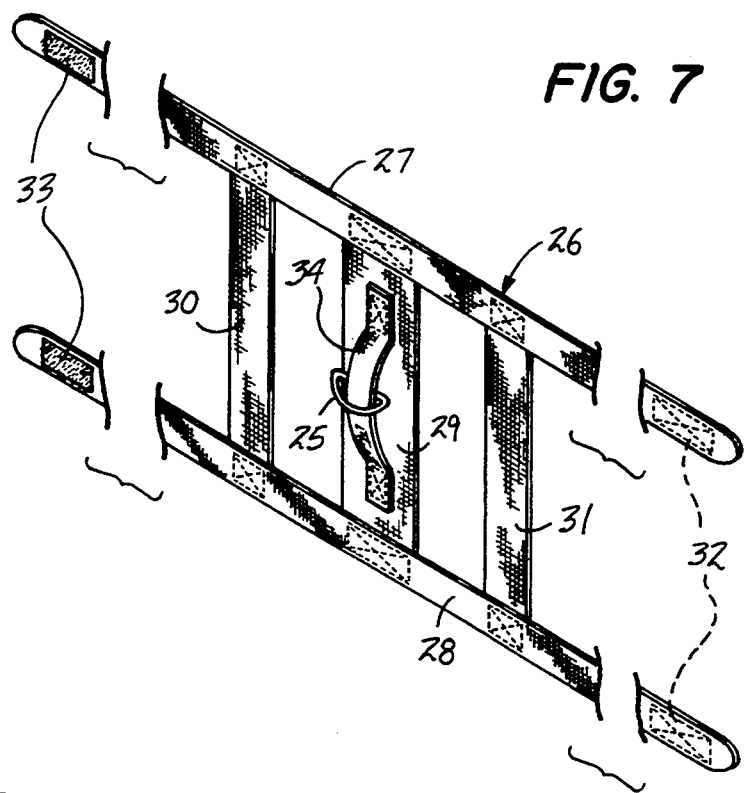
FIG. 7 is a prospective illustration of the harness member of the invention.
Figure 8:
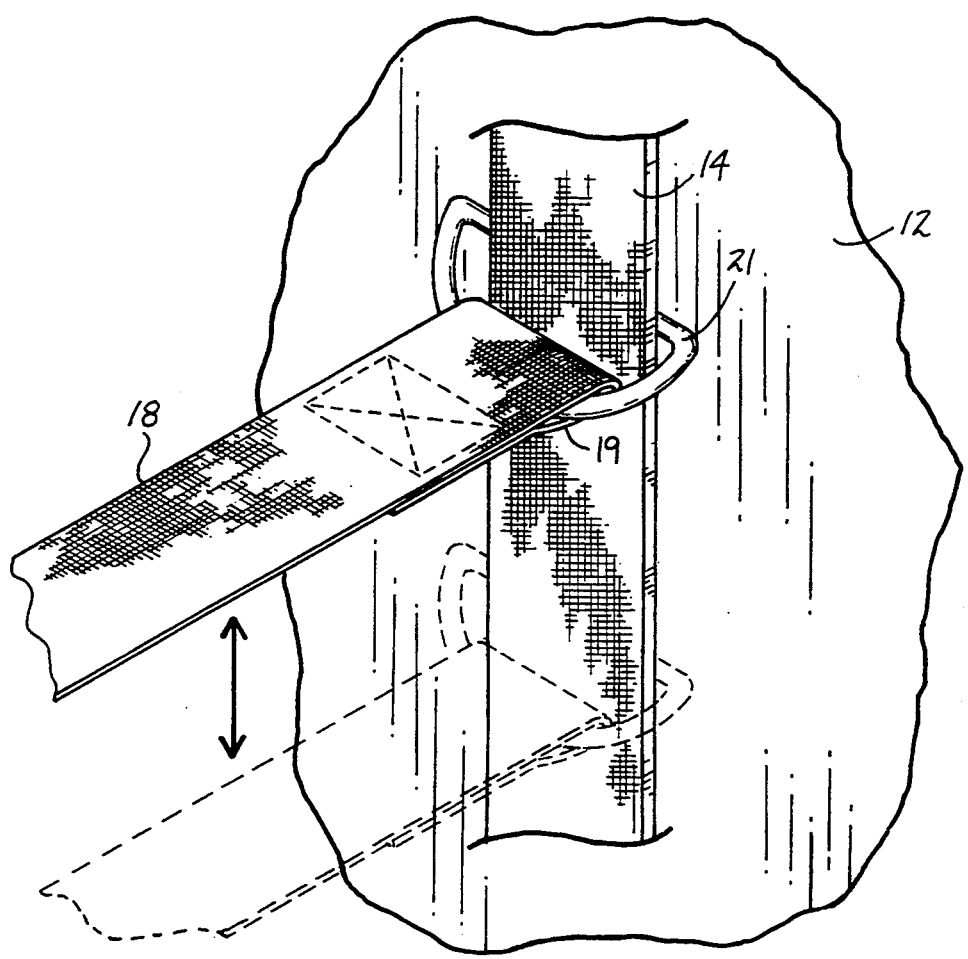
FIG. 8 is a prospective enlarged view of section 8 as set forth in FIG. 3.

FIGS. 3-8 indicate the canine seat belt structure of the invention, wherein the seat belt structure 10 of the invention is indicated as mounted to a vehicle seat 13 having a first cushion member 11 and a second cushion member 12 mounted to the first cushion member, with the second cushion member 12 in a generally vertical orientation relative to the horizontal orientation of the first cushion member 11. A flexible first web 14 is arranged for securement in surrounding relationship relative to the second cushion member 12, such that the first web 14 is provided with first and second buckle members 15 and 16 mounted to respective first and second ends of the first web 14, such that the first and second buckles 15 and 16 are arranged for securement relative to one another in a selective manner as desired, as illustrated in FIG. 5, with an adjustable buckle 17 arranged for providing for effective lengthening and shortening of the first web 14 for securement about the second cushion member 12. A tether strap 18 is provided having a first loop 19 at a first end of the tether strap, and a second end of the tether strap 18 provided with a second loop 20. The first loop 19 is provided with a first "D" ring 21 arranged for slidably receiving the first web 14 therethrough, as illustrated in FIG. 8 for example, with the tether strap second loop 20 arranged for securement to a second "D" ring 22 slidably receiving the second loop 20 therethrough, such that the second "D" ring 22 has secured thereto a hook member 23 having a slide latch 24 providing for an enclosed loop to be selectively closed by the slide latch of the hook member 23. The hook member 23 in turn is arranged for receiving a third "D" ring 25, that in turn is mounted to a harness member 26. The harness member 26, of a type as illustrated in FIG. 7, is arranged for securement about the animal, in a manner as indicated in FIG. 3. The harness member 26 is provided with flexible, parallel, and coextensive first and second straps 27 and 28, having a central connecting web 29 mounted fixedly, orthogonally, and medially of the first and second straps 27 and 28, such that a mounting central web strap 34 is slidably directed through the third "D" ring 25 providing for ease of pivoting and sliding of the third "D" ring 25 relative to the mounting of the central web strap 34. First and second outer connecting webs 30 and 3 are directed parallel relative to one another and on opposed sides of the central connecting web 29 to provide for securement of the first and second straps relative to one another, with the first and second outer connecting webs 30 and 31 permitting in a spaced relationship relative to the central connecting web 29, ease of securement and mounting about the animal, as indicated in FIG. 3. Each of the first and second straps 27 and 28 has a first end provided with a first hook and loop fastener portion 32, with each second end of each of the first and second straps having a second hook and loop fastener portion 33 cooperatively secured to the first hook and loop fastener portion 32 for securing the first and second ends of the first and second straps 27 and 28 together for securement about the animal in an easily mounted and secured relationship, as illustrated in the FIG. 3 of the drawings.

In this manner, the animal is readily secured to the canine seat belt structure 10 permitting the animal relative ease of movement relative to a seated, lying, or raised orientation by the sliding of the first "D" ring 21 relative to the first web 14, as illustrated in FIG. 8. The animal is thusly secured relative to the vehicle seat 13 or permitting ease of movement relative to the vehicle seat in use.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by LETTERS PATENT of the United States is as follows:

1. A canine seat belt arranged for mounting to a vehicle seat, with the vehicle seat having a first cushion member obliquely mounted to a second cushion member, and wherein the seat belt comprises:
   a flexible first web, only having a first web first buckle and a first web second buckle, with the first web first buckle and the first web second buckle arranged for securement relative to one another in surrounding relationship relative to the vehicle second cushion member, and
   a tether strap, the tether strap having a tether strap first end and a tether strap second end, the tether strap first end including a first loop, the tether strap second end including a second loop, and
   the first loop including a rigid first "D" ring slidably receiving the first tether strap first loop therethrough, and a rigid second "D" ring slidably receiving a tether strap second loop therethrough, and
   the first "D" ring and slidably receiving the first web therethrough, with the second "D" ring having a hook member secured thereto, and
   a harness member, the harness member including a first strap spaced from and parallel to a second strap in a coextensive relationship, with a central connecting web extending fixedly, medially, and orthogonally between the first strap and the second strap, and the central connecting web having a central web strap, with the central web strap further including a third "D" ring slidably receiving the central web strap therethrough, and the central web strap having a central web strap first end and a central web strap second end secured to the central connecting web, with the harness member arranged for securement about an animal member;
   a first outer connecting web extends in a parallel, spaced relationship relative to the central connecting web, with the first outer connecting web secured to the first strap and the second strap to a first side of the central connecting web, and a second outer connecting web secured to the first strap and the second strap spaced from the central connecting web relative to a second side of the central connecting web, with the central connecting web, the first outer connecting web, and the second outer connecting web arranged in a parallel relationship relative to one another.

2. A canine seat belt as set forth in claim 1 wherein the first strap and the second strap each include a first end, and each include a second end, with each first end having a first hook and loop fastener portion, and each second end having a second hook and loop fastener portion, with each said first hook and loop fastener portion arranged for securement to one said second hook and loop fastener portion.

* * * * *